United States Patent [19]

Koster

[11] 3,746,486

[45] July 17, 1973

[54] APPARATUS FOR CONTROLLING POLYMER PRESSURE

[75] Inventor: Olav E. Koster, Arnhem, Netherlands

[73] Assignee: Akzona Incorporated, Ashville, N.C.

[22] Filed: Nov. 13, 1970

[21] Appl. No.: 89,338

[30] Foreign Application Priority Data
Nov. 29, 1969 Netherlands .................... 6917982

[52] U.S. Cl. ........ 425/146, 137/505.21, 137/505.22
[51] Int. Cl. ............................................... B29f 3/06
[58] Field of Search ............... 18/2 HA, 2 HR, 2 G,
18/12 G, 8 A, 8 D, 30 CM, 30 CR, 30 CV;
425/145, 146; 137/505.21, 505.22

[56] References Cited
UNITED STATES PATENTS

| 3,248,469 | 4/1966 | Kosinsky et al. | 18/2 HA UX |
|---|---|---|---|
| 3,026,564 | 3/1962 | Kohlwey | 18/14 G X |
| 3,032,822 | 5/1962 | Maddock | 18/2 HA UX |
| 3,111,707 | 11/1963 | Buckley | 18/2 HA |
| 3,252,320 | 5/1966 | Welty | 18/2 HA |
| 3,456,298 | 7/1969 | Foster et al. | 18/2 HA X |
| 387,851 | 8/1888 | Braggins | 137/505.22 X |
| 404,586 | 6/1889 | Andre | 137/505.22 |
| 2,196,251 | 4/1940 | Conrad | 137/505.22 |
| 2,996,076 | 8/1961 | Dion-Biro | 137/505.21 |
| 3,174,505 | 3/1965 | Bauer | 137/505.21 X |

*Primary Examiner*—J. Spencer Overholser
*Assistant Examiner*—Michael O. Sutton
*Attorney*—Francis W. Young

[57] ABSTRACT

Means for controlling polymer pressure in a molding device by varying pressures in a stepping mode to both sides of the diaphragm-operated control valve.

3 Claims, 2 Drawing Figures

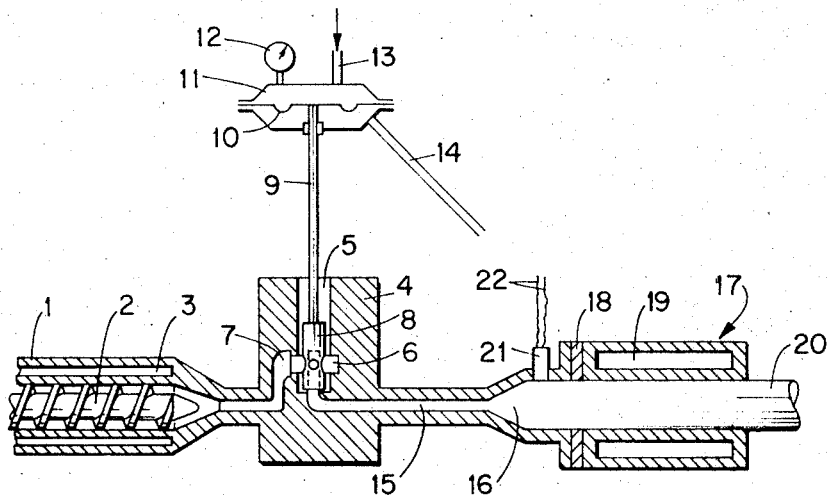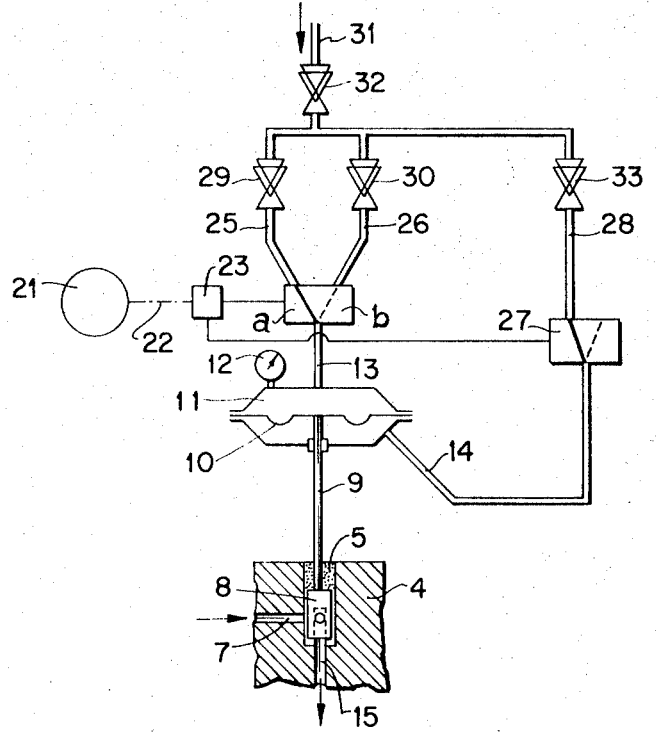

APPARATUS FOR CONTROLLING POLYMER PRESSURE

In the extrusion of shaped articles such as rods, tubes, plates, and the like from polymeric materials, the polymer pressure must be maintained within a given minimum and maximum value for optimum performance. An increase in the polymer extrusion pressure above the maximum preferred value may lead to excessive sticking within an associated polymer cooling device. This excessive sticking usually causes dimensional deviations and may give rise to surface damage of the extruded polymer. The sticking of the polymer also tends to restrict flow of material from the extruder, causing the material to become overheated within the extruder. A low polymer pressure may result in excessive and non-uniform shrinkage of the molded polymer.

An object of the present invention is to provide a means for controlling the polymer pressure within the preferred extrusion pressure limits.

Another object of this invention is to provide means for controlling fluctuations of the polymer pressure within a molding device.

Still another object of the invention is to provide means for controlling rapid fluctuations of polymer pressure within a polymeric molding device.

Another object of this invention is to provide additional rapid controlling means for excessive pressure fluctuations within a polymeric molding device.

The rapid action of the control system insures that pressure peaks within the system do not exceed the maximum permissible value. This has a favorable influence on the performance of the production process.

An additional advantage of the rapid acting control system is that the polymer temperature can be set at a lower value. This permits higher production since less heat need be carried off by the accompanying cooling device. A comparison between the output of an extrusion machine according to the invention before and after the improvement showed an increase in the production of nylon 6 rod material of 10 percent. Lower polymer temperature increases polymer viscosity that might cause pressure fluctuations to be more pronounced, but the rapid-acting control system of the present invention prevents these pressure peaks from becoming so high that the extruded shape sticks in the molding device. When the extrusion machine is coupled with two or more molding devices the present invention is particularly useful. The rapid decreases in polymer pressure which may be obtained prevent excessive sticking of the polymer in a mold if one or more of the other molds is interrupted.

The apparatus of the present invention comprises a pressure control valve in cooperation with polymer extrusion means and polymer molding means. The control valve located in a feed duct linking the extrusion means and molding means is actuated by a double-acting diaphragm capable of being pressured from either side. A pressure transducer located in the molding means senses the pressure within that means and signals a compressed gas supply to the diaphragm to adjust the pressure control valve in accordance with the sensed pressure.

Polymer flow through the pressure control valve is determined by a baffle within the valve passage. Pressure of the polymer on the baffle exerts a force tending to close the baffle. This force is opposed by compressed gas on one side of the diaphragm. When the pressure transducer senses an increase in polymer pressure in the molding device, it signals the fluid system to reduce fluid pressure on the valve diaphragm, closing the baffle partly. This closing restricts polymer flow to the molding device, thereby reducing the pressure in that device.

It has now been found the operating speed of the control system can be considerably increased by accelerating movement of the baffle when the polymer pressure has exceeded a given value. This is accomplished by applying a second fluid pressure to the opposite side of the diaphragm tending to close the baffle when the pressure transducer signals a second level pressure value has been reached. This second fluid pressure system may be constructed to vary the gas proportionately with fluctuations of polymer pressure. Practice has shown it often sufficies to apply the second fluid pressure only after polymer pressure has exceeded a given value, however.

FIG. 1 represents a schematic representation of the present invention.

FIG. 2 is a schematic representation of the fluid pressure control system.

In FIG. 1 the barrel 1 of an extrusion machine may be heated by passing a liquid or gas through the jacket 3. Reference numeral 2 indicates the extruder screw. Molten polymer is forced from the extrusion machine through a pressure reducing valve 4 and then to the molding device 16. The pressure reducing valve 4 comprises a cylindrical bore 5 in which a chamber 6 is turned. Opening into chamber 6 is a feed duct 7 through which the melt is supplied from the extrusion machine.

In the cylindrical bore 5 a baffle 8 determines the flow area of passage from the chamber 6 to the bore 5. A coupling rod 9 connects the baffle 8 to the center of a double-acting diaphragm 10, which is clamped between the flanges of a split housing 11. Connected with the upper cover of housing 11 are a pressure gauge 12 and a feed conduit 13 for compressed gas. Connected with the lower cover is another feed conduit 14 for compressed gas.

The duct 15 opens into a molding device 16, the shape of the exit corresponding to the cross-sectional shape of the profile to be formed. The molding device 16 is separated from a cooling device 17 by a disc 18 which is made of heat insulating material. Coolant 19 is circulated through the cooling device 17 to dissipate heat in the polymeric material 20 causing it to solidify into the desired shape.

Located as near the exit of the molding device 16 as possible is a pressure sensing device 21 which registers the polymer pressure and converts it into an electrical signal which can be transmitted by conventional means over the electrical circuit 22.

FIG. 2 schematically shows the control of gas pressure over and under a diaphragm 10 by the electrical signals produced by the pressure sensing device 21. The electrical signal from the pressure sensing device 21 is transmitted through the electrical circuit 22 to an electromagnetic switch 23.

Switch 23 operates a three-way valve 24 which is included in the gas conduits 25 and 26, as well as a three-way valve 27 which is included in the gas conduit 28. The delivery side of the three-way valve 24 is connected with conduit 13. The schematically indicated electrical circuit 22 is such that at all times only one of the conduits 25 and 26 is connected through the conduit 13 to the space over the diaphragm 10. The compressed gas supplied through conduit 31 passes through reducing valve 32 and is supplied to the inlets of reducing valves 29, 30 and 33. Conduits 25 and 26 are attached respectively to the exits of reducing valves 29 and 30 and to the three-way valve 24. Conduit 28 connects the exit of reducing valve 33 to one inlet of the three-way valve 27. The other inlet of three-way valve 27 is open to atmospheric pressure. The exit of valve 27 is connected to the lower side of housing 11 by conduit 14.

The reducing valves 29 and 30 are adjusted so that switching of the valve 24 produces a different gas pressure over the diaphragm 10 through conduit 13. In normal operation, compressed gas is supplied to the upper portion of the diaphragm 10 from the reducing valve 29 through passage a and conduit 13. Passage b in valve 24 is normally closed. Also in normal operation, valve 27 and the lower side of diaphragm 10 is open to atmospheric conditions. When polymer pressure in the molding device 16 exceeds a given value, the pressure sensing device 21 will emit an electrical signal to the electromagnetic switch 23 closing passage a and opening passage b. As a result, the gas pressure over the diaphragm 10 will decrease and baffle 8 will be forced upward by the polymer pressure prevailing under it. This upward movement results in a reduction of the flow area in the passage from the chamber 6 to the bore 5.

A further increase in polymer pressure will cause a pressure sensing device 21 to again emit a signal to the electromagnetic switch 23 which will actuate three-way valve 27, thereby connecting compressed gas through reducing valve 33 to the bottom side of diaphragm 10. As a result the connecting rod 9 is forced upward cooperating with the polymer pressure and duct 15 to cause a more rapid reduction of the passage from chamber 6 to the bore 5. Preferably the second signal is not emitted until polymer pressure in the molding means has exceeded at least one and one-half times the difference between the preferred polymer pressure and the first signal pressure.

What is claimed is:

1. Apparatus for controlling polymer pressure in an extrusion molding process, comprising:
   a. a means for shaping molten polymeric material;
   b. a feed duct for directing said molten polymeric material from an extrusion means to said shaping means;
   c. a baffle in said feed duct for varying polymer flow from the extrusion means to the molding means, said baffle tending to close the feed duct due to polymer pressure within the duct;
   d. primary baffle control means responsive to polymer pressure for maintaining the baffle in equilibrium at a preferred polymer pressure, said baffle control partly closing the baffle when the preferred polymer pressure has been exceeded by a first level; and
   e. secondary baffle control means responsive to polymer pressure for closing the baffle, said secondary baffle control means operating in addition to said primary baffle control means to rapidly close the baffle when the preferred polymer has been exceeded by a second higher pressure level.

2. Apparatus for controlling polymer pressure in an extrusion molding process comprising:
   a feed duct for directing molten polymeric material from an extrusion means to a molding means;
   a baffle in said feed duct for varying polymer flow from the extrusion means to the molding means, said baffle tending to close the feed duct due to polymer pressure within the duct;
   a double-acting diaphragm operably connected to the baffle;
   a diaphragm housing comprising an opening chamber and a closing chamber separated by the diaphragm, said opening and closing chamber having inlets for receiving compressed gas;
   a pressure sensing means in said molding means for emitting a first high pressure signal and a second high pressure signal, the first signal being emitted when a given polymer pressure higher than the preferred polymer pressure exists in the molding means, the second signal being emitted when a given polymer pressure higher than the first signal pressure exists;
   an opening valve connected to the inlet of the diaphragm housing opening chamber for alternately supplying a first compressed gas and a second compressed gas to the inlet, said first gas pressure displacing the diaphragm to open the baffle in the feed duct whereby a preferred polymer pressure is maintained in the molding means, and said second gas pressure displacing the diaphragm by a lesser amount than said first means thereby restricting polymer flow from the extrusion means to reduce polymer pressure in the molding means;
   a closing valve connected to the inlet of the diaphragm housing closing chamber for alternately supplying a gas at ambient conditions and a third compressed gas to the closing inlet, said third compressed gas tending to displace the diaphragm to close the baffle; and
   switching means connected to said opening valve and closing valve, said switching means urging the opening valve to supply the first compressed gas to the opening chamber and urging the closing valve to supply ambient gas when the preferred polymer pressure is maintained in the molding means, said switching means urging the opening valve to supply the second compressed gas to the opening chamber in response to said first emitted signal, and said switching means urging the closing valve to supply the third compressed gas to the closing chamber in response to said second emitted signal, the combination of the third gas, second gas and polymer pressure on the baffle causing a rapid closing of the baffle to prevent high polymer pressure in the molding means.

3. The apparatus of claim 2 wherein the second signal is not emitted until polymer pressure in the molding means has exceeded at least one and one-half times the difference between the preferred polymer pressure and the first signal pressure.

* * * * *